Dec. 29, 1936.                E. G. STAUDE                2,065,911
                         POWER AMPLIFYING DEVICE
                         Filed June 6, 1932        4 Sheets-Sheet 1
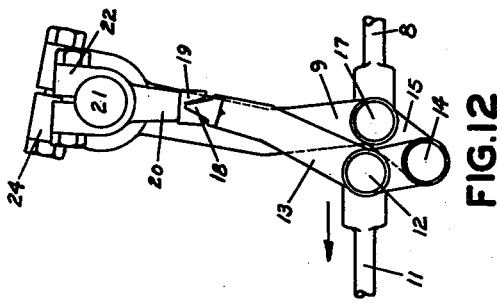
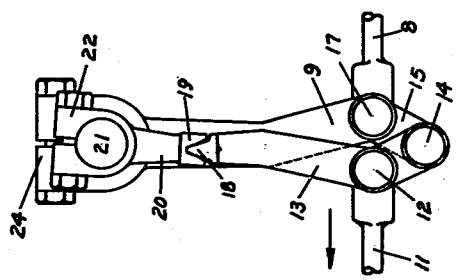
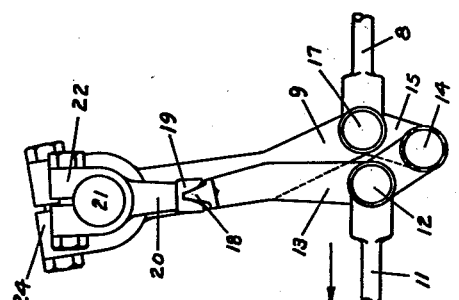
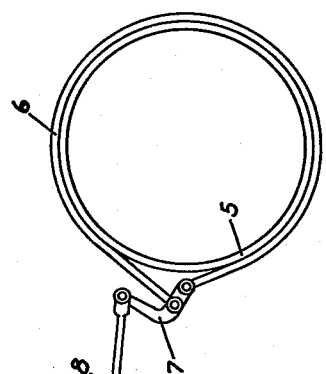
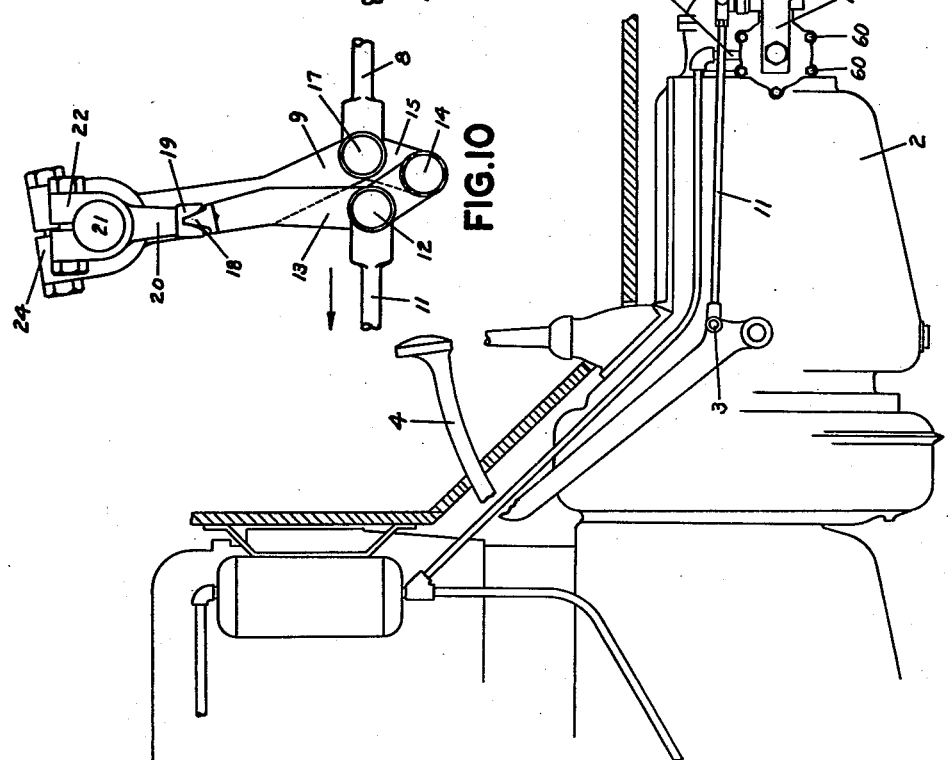
INVENTOR
EDWIN G. STAUDE
BY *Paul Paul Nelson*
ATTORNEYS

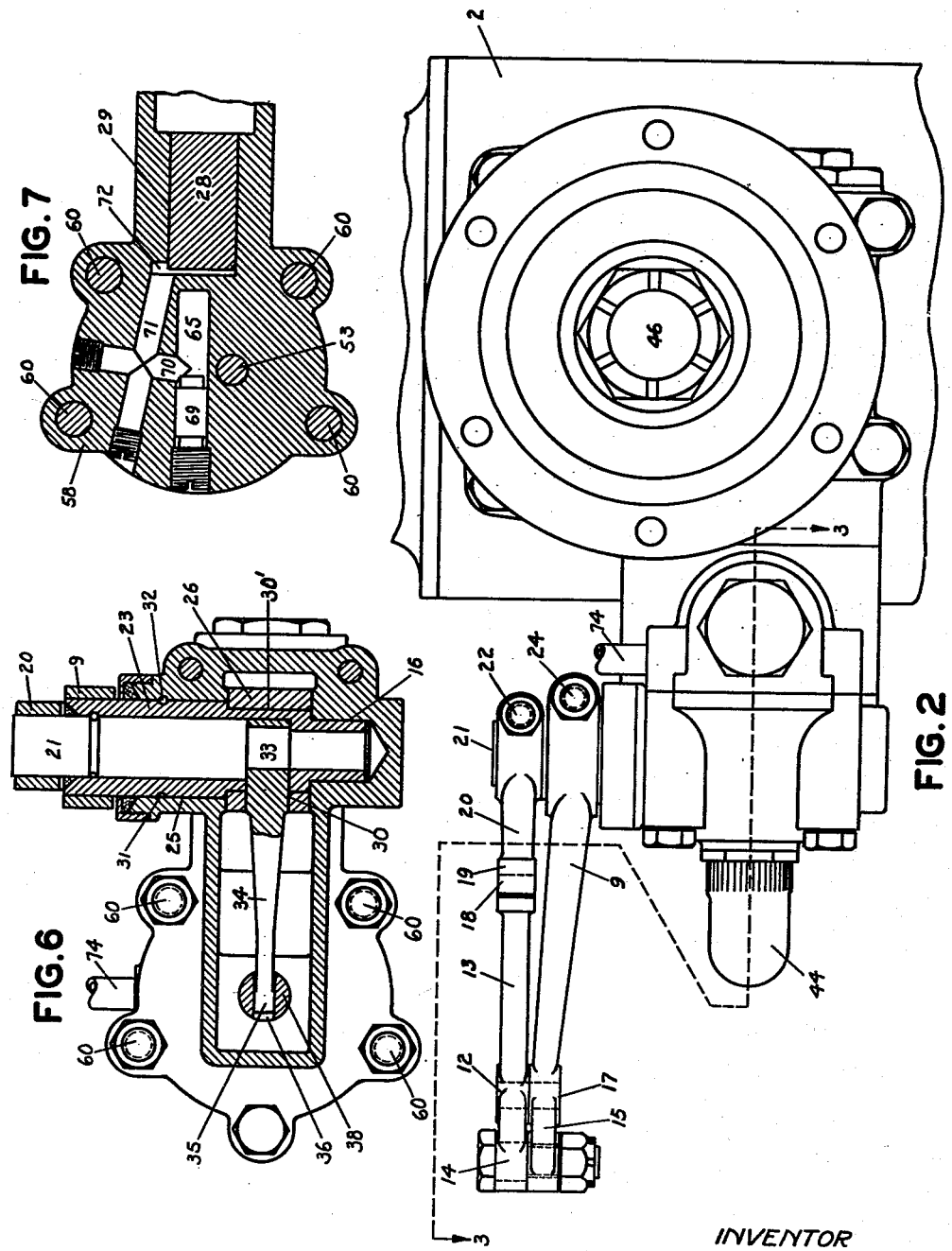

Dec. 29, 1936.  E. G. STAUDE  2,065,911
POWER AMPLIFYING DEVICE
Filed June 6, 1932  4 Sheets—Sheet 3
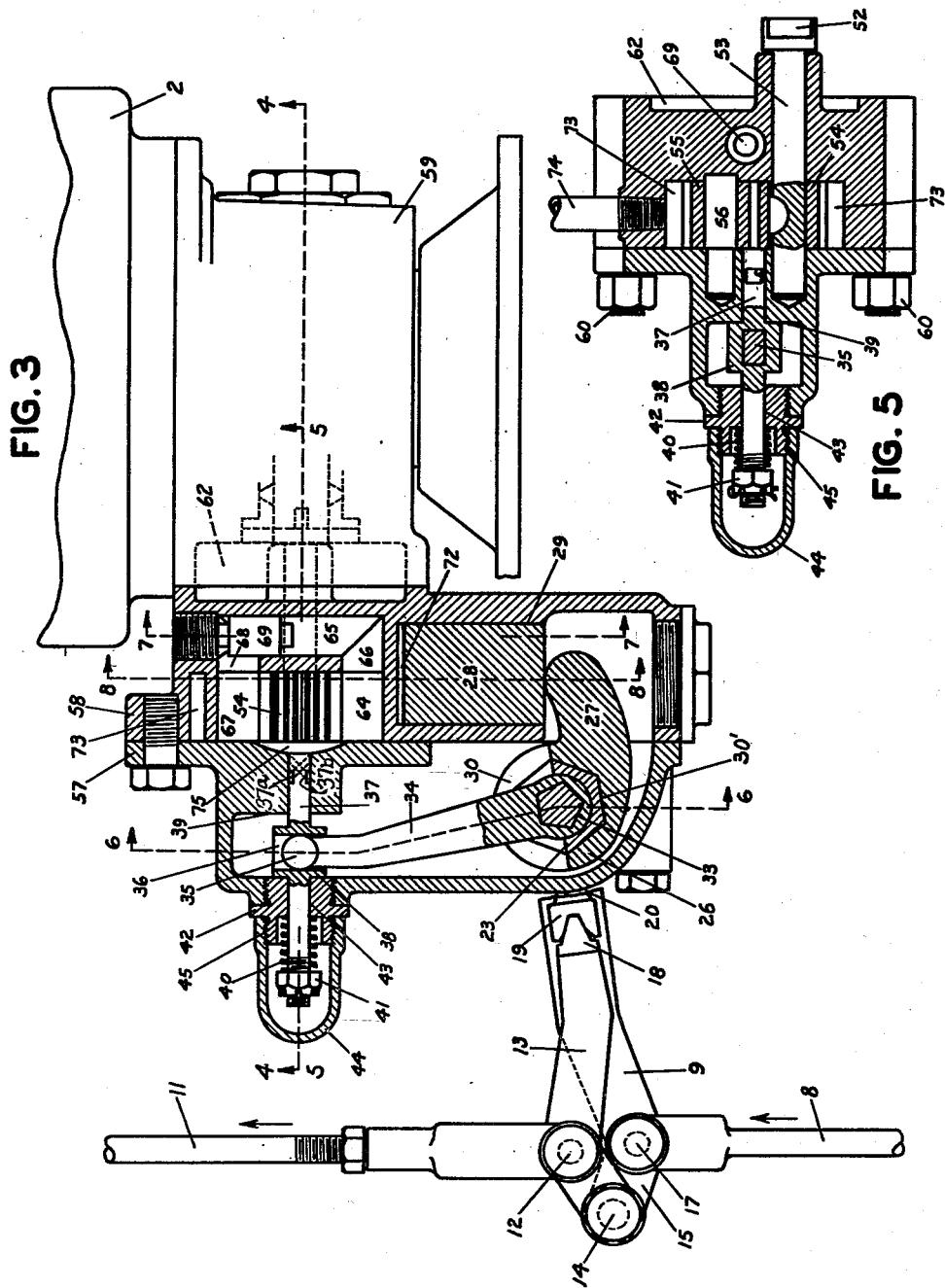
INVENTOR
EDWIN G. STAUDE
BY
ATTORNEYS Dec. 29, 1936.  E. G. STAUDE  2,065,911
POWER AMPLIFYING DEVICE
Filed June 6, 1932   4 Sheets—Sheet 4
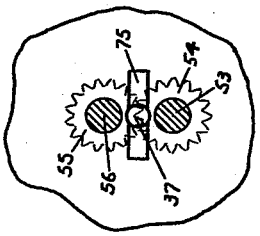
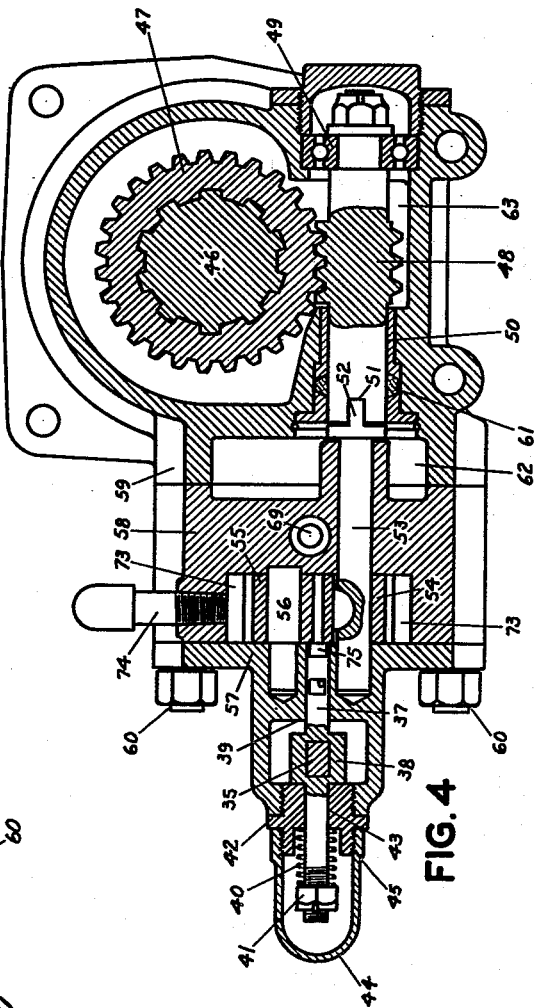
INVENTOR
EDWIN G. STAUDE
BY
ATTORNEYS Patented Dec. 29, 1936

2,065,911

UNITED STATES PATENT OFFICE 2,065,911

POWER AMPLIFYING DEVICE

Edwin G. Staude, Minneapolis, Minn.

Application June 6, 1932, Serial No. 615,621

8 Claims. (Cl. 188—152)

This invention relates generally to improvements in fluid operable mechanisms, and finds valuable application as means for supplementing and progressively amplifying the manual effort, in operating motor car controls, including brakes.

This invention is related to my copending applications for Power amplifying devices, and Pump construction, respectively bearing Serial Numbers, 615,620 and 615,622 both filed June 6, 1932.

An object of my present invention is to provide a self-contained mechanism or unit of unusually small size, and one which is inexpensive to manufacture, without sacrificing any desirable features of the large, complicated and expensive mechanisms heretofore used for this purpose.

Another object of this invention is to provide a mechanism for controlling the volume of a brake-operating fluid pump, so that as the brake pedal is moved in brake-applying direction, pump pressure is, without "lag" or "delay", progressively built up.

Another object is to so construct the device that this pressure acts against the brake pedal effort in a manner to obtain and retain a proportionate "feel" to the end that the driver can obtain definite, positive, and progressive control of the power amplifier at all times, and so that the slightest retraction of the brake pedal is instantly responded to by the brake rod, and so that the "follow-up" of the amplifying means proportional to the brake pedal effort shall not only operate instantly during the brake applying effort, but also respond equally well during the releasing period. Under the construction disclosed in this invention where the discharge side of the pump is directly connected to the intake side with the shortest possible circuit, it is obvious that the pump will operate with the least amount of friction and, therefore, with the least amount of heat.

The construction embodied in this invention lends itself to an unusually simple design and inexpensive application to motor vehicles generally, including hydraulic braking systems.

Features include the details of construction, along with the broader ideas of means inherent in the disclosure.

Other objects, features and advantages of the invention will readily appear from the description of the drawings forming a part of this application, and in said drawings Figure 1 is a somewhat diagrammatic side elevation illustrating the application of the invention to the braking system of an automobile;

Figure 2 is a rear end view of the power amplifier as applied to the transmission case of a conventional type of motor vehicle;

Figure 3 is a plan section of the amplifier on line 3—3 of Figure 2, showing the means for operating the brake rod connections;

Figure 4 is a vertical section on line 4—4 of Figure 3, also showing the pump gear drive connection with the transmission of the automobile;

Figure 5 is a partial section similar to Figure 4, with the pump volume control plunger shown in closed or seal-making position;

Figure 6 is a vertical section on line 6—6 of Figure 3 through the control shafts;

Figure 7 is a vertical section on line 7—7 of Figure 3, through the fluid circuit reversing means of the pump;

Figure 8 is a vertical section on line 8—8 of Figure 3, further illustrating the pump circuit, and piston controlled thereby;

Figure 9 is a detail of the volume control, or seal control means, showing its relation to the pitch circles of the pump gears, and to the by-passage; and Figures 10, 11 and 12 are diagrammatic views illustrating the action of the control levers, as part of the operating connections between the pedal and brake line rods.

Referring to the drawings, 2 represents a conventional motor car transmission case having the usual brake pedal 4 supported thereon. The conventional brake device consists of the brake drum 5, brake band 6, bell crank 7, and brake rod 8. The brake rod 8 is pivotally connected to the brake rod arm 9 of the power amplifier, generally indicated at 10. The brake pedal 4 is connected, as at 3, to rod 11, and rod 11 is connected as at 12 to the brake pedal arm 13 of the amplifier 10. The arm 13 is pivoted at 14 to a projection 15 of the arm 9. The brake rod 8 is connected to the arm 9 at 17.

Referring to Figures 2, 3, and 6: The arm 13 has a gear tooth connection at 18 with the member 19 on the arm 20, to obtain oscillatory motion between the two members. The arm 20 is secured to the shaft 21 by the clamping means 22. Referring to Figures 6 and 2, the arm 9 is secured to the sleeve 23 by clamping means 24. The sleeve 23 is concentric with the shaft 21, and acts as a bearing therefor. The sleeve 21 is journaled in bearings 16 and 25.

This sleeve 23, see Figure 3, has secured to it at its lower end, a member 26, having an extension 27, bearing against a piston 28, which operates in a cylinder 29 in communication with the pump passage, see Figure 7. The member 26 has a portion cut away as at 30, see Figures 6 and 3, and is mounted on the sleeve 23 by sliding over a hexagon-shaped surface 30' of sleeve 23. To secure the sleeve 23 in operative position (see Figure 6) an annular groove 31 is provided therein, to receive a pin 32 traversing bearing 25 at such position as to engage the groove 31 tangentially, to permit the sleeve 23 to oscillate freely, but to prevent translative movement thereof.

On the lower portion of the shaft 21, pentagonal surface 33 is provided to receive an arm 34. The arm 34 operates in the cut away portion 30 of the member 26, and in a corresponding cut away portion of the sleeve 23 (see Figure 3). The arm 34 must, therefore, move with the shaft 21 controlled by arm 20. The outer end of the arm 34 is provided with an enlarged portion 35, slidable in a slot 36 of the enlarged portion 38 of the volume control member 37. The member 35 is adapted to control the position of the volume control member 37, which is balanced against lateral pressure by the diagonal passageways 37a, 37b. Due to the construction of the members 35 and 36, volume control member 37 cannot rotate, but can reciprocate.

When the volume control member is in closed or seal-making position, shown in Figure 5, member 38 engages surface 39, as a stop, to limit the movement of the member 37.

In order to keep the member 37 normally in the open position shown in Figure 3, a spring 40 is provided which is adjusted to the correct tension by a castle nut 41. A threaded plug 42 provides a bearing 43 for the member 37, and also serves to pocket the spring 40. A cap 44, threaded on the correspondingly threaded portion 45 of the plug 42, covers the end of the reciprocating member 37.

The member 37 is a pump seal plunger making and breaking element, and operates at the meshing point of the pump gears. Referring to Figure 4, 46 is the usual transmission drive shaft of an automobile, to which the propeller shaft connections are made. On this drive shaft on the outside of the transmission case, a spiral gear 47 is provided to mesh with a worm gear 48, which operates preferably at a speed twice that of gear 47. The worm gear shaft is mounted in a usual ball thrust bearing 49 and sleeve bearing 50. On one end of the worm gear 48, a socket 51 is provided to receive a projection 52 on shaft 53 which drives one of the pump gears 54. Numeral 55 indicates the companion pump gear which is mounted to revolve freely on the shaft 56 fixed in part 57.

The unit is preferably made in three parts, 57, 58 and 59, bolted together by bolts 60, all to simplify manufacture and quick assembly.

Suitable packing element is provided at 61 to prevent fluid draining from the chamber 62 into the space 63 occupied by the worm gear 48 and the worm gear 47, since the lubrication for these gears is preferably provided by the usual transmission lubricating fluid; whereas, the fluid used in the pump gears 54 and 55 may be the same as used in the lubricating system of the engine.

Referring to Figure 8. When the car is moving forwardly, gear 54 is driven by the shaft 53 counter-clockwise, which sets up fluid pressure in passage 64. Referring to Figure 3—passage 64 is connected to passage 65 by a short passage 66. The passage 67 is connected to the passage 65 by the short passage 68. A pressure accumulates in the port 64 against the plunger 69 in passage 65, it forces it into the position shown in Figures 3 and 7 and thus uncovers the port 70 which connects with the passage 71 leading into space 72 which communicates with cylinder 29 to act against the piston 28 (see Figures 3, 7 and 8). When the pump gears 54 and 55 revolve in the opposite direction, as for instance when the motor vehicle is backing up, then pressure accumulates in the passage 67, and acts against the back of the plunger 69, causing it to move to the opposite end of the passage 65 and establish communication between passages 67—68 and port 70 and passage 71 and space 72. It is, therefore, clear that regardless of the direction of rotation of the pump gear, the effective pressure against the piston 28 is always obtained.

Referring to Figures 1 and 8, the low pressure or intake side of the pump gears 54 and 55 is the passage 73. This passage is connected by a copper tubing 74 with the discharge of the oil purifier now common on the engine of the conventional type of motor vehicle. The purpose of this connection is to provide automatic replenishing of the fluid lost through evaporation, leakage, etc., and at the same time provide a sort of breather space through which gases or fumes may escape, if developed as a result of warming of the pump gears due to long continued use, as for instance during long and continuous brake application.

The volume control member 37 operates to proportionately control the fluid pressure against the piston 28, and at the same time acts to insure a proportional back pressure against the brake pedal, to obtain a "feel". In order to incapacitate the pump during the period when pressure is not desired, and without creating a vacuum, I provide a slot 75, see Figures 3 and 9, at the meshing point of the gears, arranged at right angles to and across a line intersecting the rotative axes of the gears. The width of the slot is substantially twice the tooth depth, and the diameter of the plunger 37 slightly greater than twice the tooth depth. This slot 75 is wide enough and deep enough so as to provide amply for the free flow of the fluid from one side of the pump gears to the other (as from passage 64 to passage 67, or reversely).

*Operation*

In order to obstruct the flow and build up a brake-operating pressure, the volume control member 37 is used. It is clear that when the member 37 has moved into the position shown in Figure 5, fluid cannot pass from one side of the pump to the other, and consequently fluid pressure is built up on the discharge side of the pump and actuates the piston 28. The degree of pumping pressure, however, is dependent upon the degree of pull exerted on the pedal rod 11, due to the back pressure against the exposed end of the member 37 (see Figure 9) and also against the tension of the spring 40 and the multiplied leverage connections between the arm 34, the arm 20, the arm 13, and the connection 12 of the rod 11 which swings from the pivot 14, multiplies the amount of pressure against the end of the member 37 a number of times, and always proportionately to the pumping pressure obtained.

For example, as braking pressure is increased from zero to seventy-five pounds, the seal is progressively established. During this time, the amplified pressure may be increased from zero to five hundred pounds.

In order to increase the pumping pressure, additional pedal effort is required, and since there is no fluid circuit except through the short passage 75, it follows that as long as the pump gears 54 and 55 are moving, the member 37 cannot entirely cut off the circulation without creating a pressure so high that the proportional effort against the piston 28 will have exerted sufficient effort on the arm 26 to lock the brakes and stop the vehicle wheels from revolving, which in turn will stop the pump gears 54 and 55 from revolving.

Ordinarily there is no need to provide a relief by-passage against excessive maximum pressure, because when such pressure is reached, the automobile wheels are locked and the pump gears are stopped.

Referring to Figures 10, 11 and 12: Upon pedal motion in the direction of the arrow in Figures 3 and 10, the shaft 21 is rotated in clockwise direction, and the arm 34 correspondingly moves, to move the element 37 to partly close the passage 75. A pressure is immediately set up which acts on the end of the piston 28, and through arm 27 and element 30 causes the lever 9 to move in the same direction as the pedal or link 11 to apply the brakes. The pedal is advanced in the usual manner and the parts eventually move forwardly to the position shown in Figure 11. After the arm 20 has assumed the position shown in Figure 11, which may correspond to an almost fully closed position of the pump seal control member, and on continued motion of the brake rod 11 in the same direction to the position in Figure 12, the arm 13 pivots or fulcrums upon the arm 20 by means of the gear tooth structure 18—19.

Braking can also be accomplished entirely manually. On initial movement of the brake rod 11 in the direction of the arrow, the element 20 is swung in clockwise direction to move the seal control member, and thereafter, and on continued motion whether the seal control member is fully closed or not, the end 18 of the element 13 which is pivoted at 14 tends constantly to move the element 20 against pressure exerted against the element 37, so that the aforesaid "feel" is obtained.

The linkage means constitutes means controlled by the pedal to move the plunger 37 toward sealing position, and allow continued motion of the pedal in the same direction regardless of the position of the plunger. In other words, the connection between the pedal and the pump seal controlling means is such as to cause lever 13 to move with 9, while 13 continues to hold 20 in seal controlling position, as the pumping pressure is built up.

Before the arm 20 moves to its maximum position, the pressures set up on the discharge side of the pump gears 54 and 55 will have increased, for example from zero to five hundred or more pounds per square inch. In the device illustrated, a pressure somewhat less than five hundred pounds is ample to lock the wheels of the motor vehicle and stop the rotation of the pump gears 54 and 55. As the levers move in the appropriate direction, a proportionate pressure is built up, which proportionate pressure exerts back pressure on the brake pedal, and also exerts a proportional power amplifying effort against the piston 28 and through the connections to the rod 8.

From the description, it is clear that perfect control of the degree of pressure exerted by the pump gears 54 and 55 is obtainable by the brake pedal at all times, which pressure results in amplifying the pedal power to set the brakes to the desired degree so that the manual braking effort will at all times result in sufficient braking power and so that a definite progressive pedal "feel" is always present.

One of the characteristics of this device is that pump pressure is entirely controlled by the sealing means, as distinguished from control by a sealing means and another valve. This control by the sealing means alone results in a much simplified construction. It is again noted that the "feel" is obtained only through plunger 37.

One part of the invention is characterized by the fact that the progressive establishment of the pumping seal progressively creates a proportional braking pressure, and by the fact that the pumping seal control means acts to exert a mechanical pressure which is mechanically transmitted to act counter to the motion of the pedal in braking direction to obtain what is known as a "feel".

As used with an automobile, the device is further characterized by the fact that the member 37 cannot entirely cut off circulation, without obtaining pressure so high that the piston will have exerted a corresponding effort to lock the brakes and stop revolution of the vehicle wheels, which acts in turn to stop the pump gears, since said gears are operated through the motion of the vehicle wheels.

In the present application, power amplification is obtained through a solid piston, a very small liquid volume is required, and heating and friction effects are reduced to the minimum.

I claim as my invention:

1. A power amplifying device including a gear pump having a by-passage connecting the discharge side of the pump with the opposite side at the meshing point of the gears, means moving toward and away from the side faces of the gears for controlling said by-passage, an enclosing casing, a lever in the casing for moving said means and a pedal for controlling said last mentioned means, by which initiation of the power amplifying operation by the pedal closes the by-passage for obtaining full pumping pressure and by which the by-pass controlling means is pressure-activated during the pumping operation against force applied to the pedal, to obtain pedal "feel".

2. In a device of the class described a mechanism to be controlled, a fluid pressure system including a gear pump, and a piston against which pumping pressure is applied, a by-passage connecting the discharge side of the pump with the opposite side at the meshing point of the gears, means for controlling flow through said by-passage, means controlled by the piston for operating the mechanism to be controlled including a first lever, means for controlling said by-passage control means including a second lever, a third lever pivoted to the first, and a pedal for operating it, said second and third levers being fulcrumed upon each other, and the levers being so arranged that on application of power to the third lever, the by-passage control means moves in passage-closing direction, and pressure is progressively set up against the piston, and this pressure is progressively transmitted to the first lever.

3. In a device of the class described a mechanism to be controlled, a fluid pressure system including a gear pump, and a piston against which pumping pressure is applied, a by-passage connecting the discharge side of the pump with the opposite side at the meshing point of the gears, means for controlling flow through said by-passage, means controlled by the piston for operating the mechanism to be controlled including a first lever, means for controlling said by-passage control means including a second lever having an axis concentric with that of the first, a third lever pivoted to the first and a pedal for operating it, said second and third levers being fulcrumed upon each other, and the levers being so arranged that on application of power to the third lever, the by-passage control means moves in passage-closing direction, and pressure is progressively set up against the piston and this pressure is progressively transmitted to the first lever.

4. A device of the class described comprising a gear pump having a pump seal, means for controlling the pump seal, a piston movable by the pumping fluid, an arm movable by the piston, a first arm operable by the arm, a second arm pivoted to said first arm, means for controlling the pump seal controlling means including a third arm and means pivoting the second and third arms, means for operating the second arm by force applied at a point between its pivotal point with the first arm and the pivoting means for the second and third arms, and means by which the first arm is operatively connected to a device to be controlled, said means being connected to said arm also at a point between its pivotal connection with the second arm and the pivoting means for the second and third arms.

5. A power amplifying unit comprising, a device to be controlled, a fluid system and means for setting up pressure in the system, controlling means cooperative with the last mentioned means for obtaining increased or decreased pressure, including a control arm, a piston against which the pressure acts, means against which the piston acts to transmit power including a first arm, a first rod connecting the first arm to the device to be controlled, a lever pivoted to the first arm at a point outwardly from the point of connection of the rod with the first arm, a second rod pivoted to the lever inwardly from its point of pivotal connection with the first arm, said second arm being substantially axially aligned with the first rod, means connecting the lever with the control arm at a point inwardly from the pivotal point of the second rod with the lever, the arrangement being such that the motion of the first lever in a certain direction progressively increases the fluid pressure, and the arrangement further being such that the rods move in the same direction to apply the power to the device to be controlled.

6. In a fluid power actuator mechanism, a device to be controlled, power input controlling means including an input lever, a power output member for actuating the device to be controlled, pump gears for generating fluid pressure, a valve located at the meshing point of said pump gears for controlling pumping volume, a reverse motion valve lever, said fluid power actuator mechanism including two connections, one connected to the power input lever and the other being connected to the device to be controlled, said input lever connection controlling said reverse motion valve lever, and a spring for normally holding said valve in anti-pressure-initiating position.

7. A power amplifying device comprising a pressure system, a power output member against which the pressure acts, said member having an output lever, input means including a valve for controlling pressure against said output member and against which the pressure reacts and including an input lever, an operating lever pivoted to the lever of the output member and operably connected with the input lever to give a short initial movement to the valve in closing direction, means for operating the valve pivoted to said operating lever between its pivotal point with the output lever and its connection with the input lever, and power transmitting means connected with said output lever beween its pivotal connection with the operating lever and its connection with the output member.

8. A power amplifying device including a gear pump having a casing, means located at the level of the meshing point of the gears for controlling full volume by passing of liquid around the gears including a short by-passage connecting the intake and discharge sides of the pump and a plunger for controlling said passage by movement toward and away from the side faces of the gears, and a pedal positively connected to the plunger for controlling said last mentioned means, by which initiation of the power amplifying operation by the pedal prevents by-passing for obtaining full pumping pressure, and by which the by-passage controlling means reacts against force applied to the pedal to obtain pedal "feel".

EDWIN G. STAUDE.